(12) United States Patent
Dörner et al.

(10) Patent No.: US 8,931,999 B2
(45) Date of Patent: Jan. 13, 2015

(54) DEVICE AND METHOD FOR UNSTACKING PLATE-SHAPED PARTS

(75) Inventors: Reiner Dörner, Eppingen (DE); Joachim Pottiez, Sulzfeld (DE)

(73) Assignee: Schuler Automation GmbH & Co. KG, Hessdorf (DE)

(*) Notice: Subject to any disclaimer, the term of this patent is extended or adjusted under 35 U.S.C. 154(b) by 616 days.

(21) Appl. No.: 12/740,945

(22) PCT Filed: Mar. 12, 2008

(86) PCT No.: PCT/EP2008/001943
§ 371 (c)(1),
(2), (4) Date: Apr. 30, 2010

(87) PCT Pub. No.: WO2009/112050
PCT Pub. Date: Sep. 17, 2009

(65) Prior Publication Data
US 2010/0266380 A1    Oct. 21, 2010

(51) Int. Cl.
| | | |
|---|---|---|
| *B65G 61/00* | (2006.01) | |
| *B65G 49/05* | (2006.01) | |
| *B65G 49/06* | (2006.01) | |
| *B65G 59/04* | (2006.01) | |
| *B65H 3/08* | (2006.01) | |
| *B65H 3/40* | (2006.01) | |
| *B21D 43/24* | (2006.01) | |

(52) U.S. Cl.
CPC ............... *B65G 59/04* (2013.01); *B65G 61/00* (2013.01); *B65H 3/0816* (2013.01); *B65H 3/40* (2013.01); *B65H 2701/173* (2013.01); *B21D 43/24* (2013.01); *B65H 2555/31* (2013.01); *Y10S 901/16* (2013.01); *Y10S 901/08* (2013.01)
USPC ...................... 414/797; 414/795.4; 414/752.1; 901/16; 901/8

(58) Field of Classification Search
USPC ........ 414/793, 793.2, 797, 797.1, 799; 901/6, 901/8, 16
See application file for complete search history.

(56) References Cited

U.S. PATENT DOCUMENTS

| | | | | |
|---|---|---|---|---|
| 4,738,387 | A * | 4/1988 | Jaufmann et al. | 228/4.1 |
| 5,161,936 | A * | 11/1992 | Kato | 414/728 |
| 6,024,530 | A * | 2/2000 | Kleineisel et al. | 414/752.1 |
| 6,523,668 | B2 * | 2/2003 | Wolz | 198/369.2 |
| 6,655,884 | B2 * | 12/2003 | Ferrari et al. | 409/212 |
| 2004/0197185 | A1 | 10/2004 | Dorner | |
| 2005/0008471 | A1 * | 1/2005 | Garcia | 414/788 |
| 2006/0099064 | A1 * | 5/2006 | Anaki et al. | 414/797 |

FOREIGN PATENT DOCUMENTS

| | | | |
|---|---|---|---|
| DE | 3020218 A1 | 1/1981 | |
| DE | 3637114 A * | 5/1988 | |
| DE | 3817117 A1 | 11/1989 | |

(Continued)

OTHER PUBLICATIONS

ABB "Automatisieren einer Pressenlinie bei Thyssen Krupp Umformtechnik" (2006).

*Primary Examiner* — Gregory Adams
(74) *Attorney, Agent, or Firm* — Browdy and Neimark, PLLC

(57) ABSTRACT

In a device for unstacking plate-shaped parts (12), in particular sheet metal blanks, comprising at least one supply station (13) in which at least one stack (14) of plate-shaped parts (12) is located and at least one conveyor station (15) on which the plate-shaped parts (12) are transported further in an unstacked manner, an unstacking unit (17) being provided for transferring the plate-shaped parts (12) between the supply station (13) and the conveyor station (15), said unstacking unit engaging the stack of parts (14) and removing individual plate-shaped parts (12) while unstacking the stack of parts (14) and depositing them in the conveyor station (15), the unstacking unit (17) comprises two robots (18a, 18b) working independently of each other, which alternately engage a common stack of parts (14) of the supply station (13) and are controlled by a control unit (19) in such a way that a first or a second robot (18a, 18b) removes a plate-shaped part (12) from the stack of parts (14) while the first robot (18a, 18b) simultaneously deposits a picked-up plate-shaped part at the conveyor station (15).

5 Claims, 2 Drawing Sheets

(56) References Cited

FOREIGN PATENT DOCUMENTS

Figure 1:
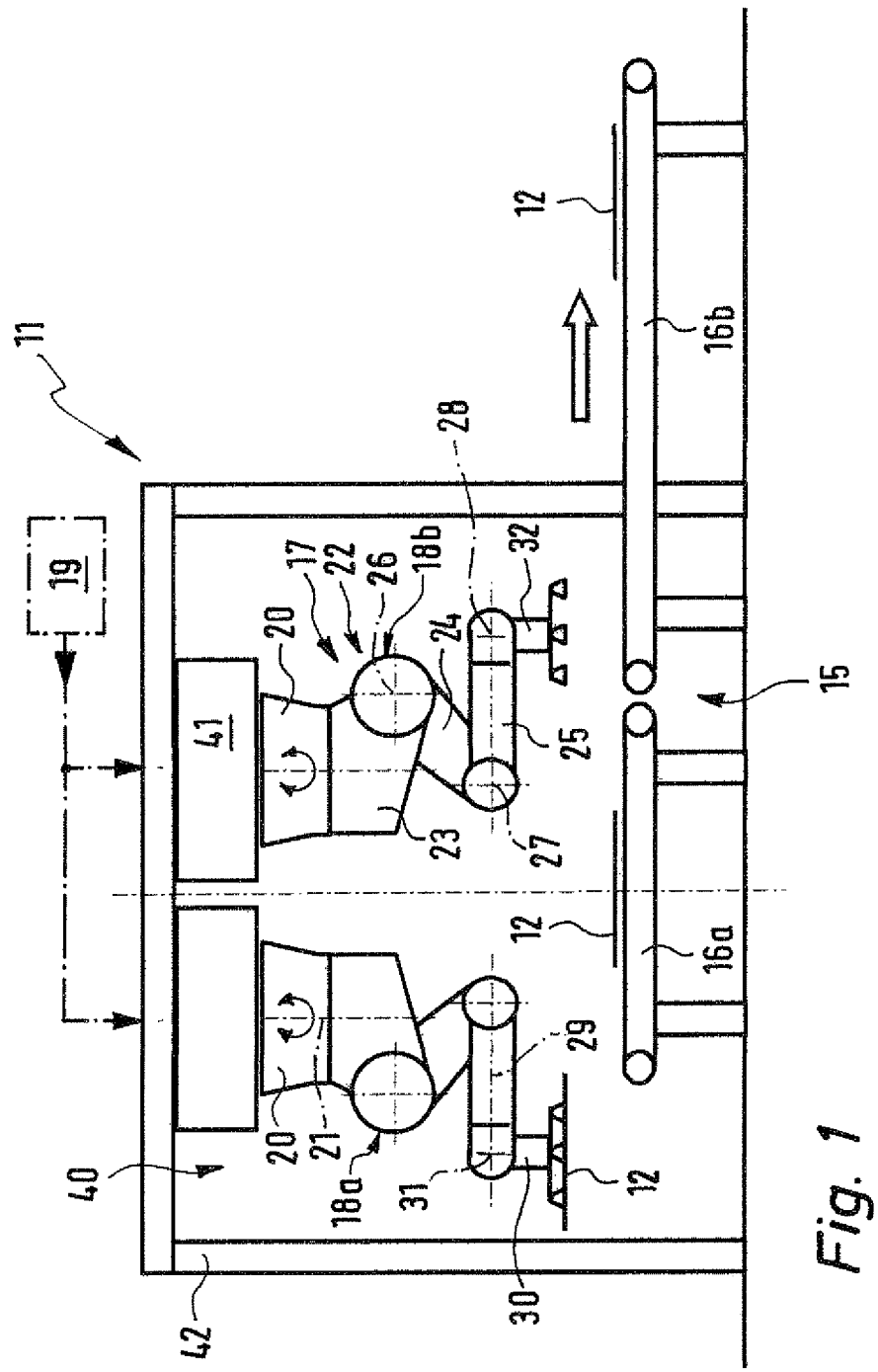

| | | |
|---|---|---|
| DE | 19856151 A1 | 4/2000 |
| DE | 20121077 U1 | 5/2003 |
| DE | 10223858 A1 * | 10/2003 ............ B65G 47/90 |
| DE | 10312927 A1 | 9/2004 |
| EP | 0 535 654 A | 4/1993 |
| WO | 0208100 A | 1/2002 |
| WO | 2006128393 A1 | 12/2006 |

* cited by examiner

DEVICE AND METHOD FOR UNSTACKING PLATE-SHAPED PARTS

The invention relates to a device for unstacking plate-shaped parts, in particular sheet metal blanks, comprising at least one supply station in which at least one stack of plate-shaped parts is located and at least one conveyor station on which the plate-shaped parts are transported further in an unstacked manner, an unstacking unit being provided for transferring the plate-shaped parts between the supply station and the conveyor station, said unstacking unit engaging the stack of parts and removing individual plate-shaped parts while unstacking the stack of parts and depositing them in the conveyor station.

Such unstacking devices have been known for a long time, in particular in the field of automation technology. They are for example used in so-called press lines to remove stacked sheet metal blanks from a stack and deposit them in a conveyor station, from where the individual unstacked sheet metal blanks are transferred to the next station until they are finally supplied to the press. In this process, so-called "overhead feeders" with suction tooling traversing along a gantry, for example in the X-, Y- and Z-directions in a compound slide arrangement, are used, permitting a precise positioning above the stack of parts. The sheet metal blanks are then picked up by the suction tooling and transferred to the conveyor station, where they are deposited.

In an unstacking device of this type, however, the number of parts which can be transferred between the supply station and the conveyor station in a given time—usually specified in strokes per minute (spm)—is limited.

From prior art, the conveying of plate-shaped parts, in particular sheet metal blanks, between a supply station and a conveyor station by means of a magnetic belt conveyor is also known.

The invention is based on the problem of creating a device of the type referred to above and a method by means of which the number of plate-shaped parts which can be taken from a stack of parts and transferred to a conveyor station in a given time can be increased compared to prior art.

This problem is solved by a device for unstacking plate-shaped parts with the features of the independent claim 1 and by a method for unstacking plate-shaped parts with the features of the independent claim 5. Further developments of the invention are specified in the dependent claims.

The device according to the invention for unstacking plate-shaped parts is characterised in that the unstacking unit comprises two robots working independently of each other, which alternately engage at least one common stack of parts of a supply station and are controlled by a control unit in such a way that a first or a second robot removes at least one plate-shaped part from the stack of parts while the second or the first robot simultaneously deposits at least one picked-up plate-shaped part at the conveyor station.

As the robots pick up parts alternately, stacks of plate-shaped parts can be removed much faster than in prior art. As a result, cycle times can be improved in the unstacking process. In addition, the two robots are controlled to operate synchronously, i.e. while one robot picks up a plate-shaped part, the other robot simultaneously deposits a picked-up part. Down times are therefore avoided, because neither of the robots has to wait for the other robot to complete its operating movement before itself performing its own operating movement. The use of robots for unstacking further results in high flexibility, as the plate-shaped parts to be unstacked can be turned over if required. The plate-shaped parts can be deposited in the conveyor or transfer station in a different orientation or alignment.

The parts transfer from the supply station to the conveyor station and the return from the conveyor station to the supply station expediently involves a swivelling motion of the two robots. Swivelling motions require little space, so that the unstacking process can run even in confined spaces.

Each robot preferably removes one individual plate-shaped part from the stack of parts in each cycle. In principle, it would be possible to operate with two or more adjacent stacks of parts, from which the topmost plate-shaped parts would the be removed simultaneously by the robot operating at the given time.

In a further development of the invention, the two robots are designed as multiaxial articulated robots with at least four pivoting axes, of which a first vertical pivoting axis allows the swivelling motion between the supply station and the conveyor station. As a result of the at least four axes, the robot can be positioned with high precision at the stack of parts or at a delivery point in the conveyor station in order to pick up the plate-shaped parts in a defined lifting motion or to deposit them in the conveyor station. Five-, six- or even seven-axis articulated robots are expediently used.

In a particularly preferred embodiment, the unstacking unit comprises a linear guide device for the horizontal linear guidance of the two robots between the supply station and the conveyor station. The robots may have an additional linear or X-axis, enabling them to bridge even distances between the supply station and the conveyor station which are not within the swivelling range of the respective robot by means of a combined swivelling and linear motion.

In a particularly preferred variant, at least one of the robots is suspended from a supporting device. Both robots are expediently suspended. As an alternative, a standing arrangement of at least one robot is possible.

The invention further relates to a method for unstacking plate-shaped parts, in particular sheet metal blanks, which is characterised by the following process steps:

provision of at least one stack of plate-shaped parts, removal of at least one plate-shaped part from the stack of parts by a first robot while another, already picked-up part is simultaneously deposited at a delivery point by a second robot operating independently of the first robot, transfer of the at least one part picked up by the first robot to the delivery point in a transfer motion including a swivelling of the first robot, while the second robot is simultaneously and without load is returned from the delivery point to the stack of parts from which the first robot has picked up by means of a return motion involving a swivelling of the second robot, removal of at least one plate-shaped part from the stack of parts by the second robot while the at least one part picked up by the first robot is simultaneously deposited at the delivery point.

Figure 2:
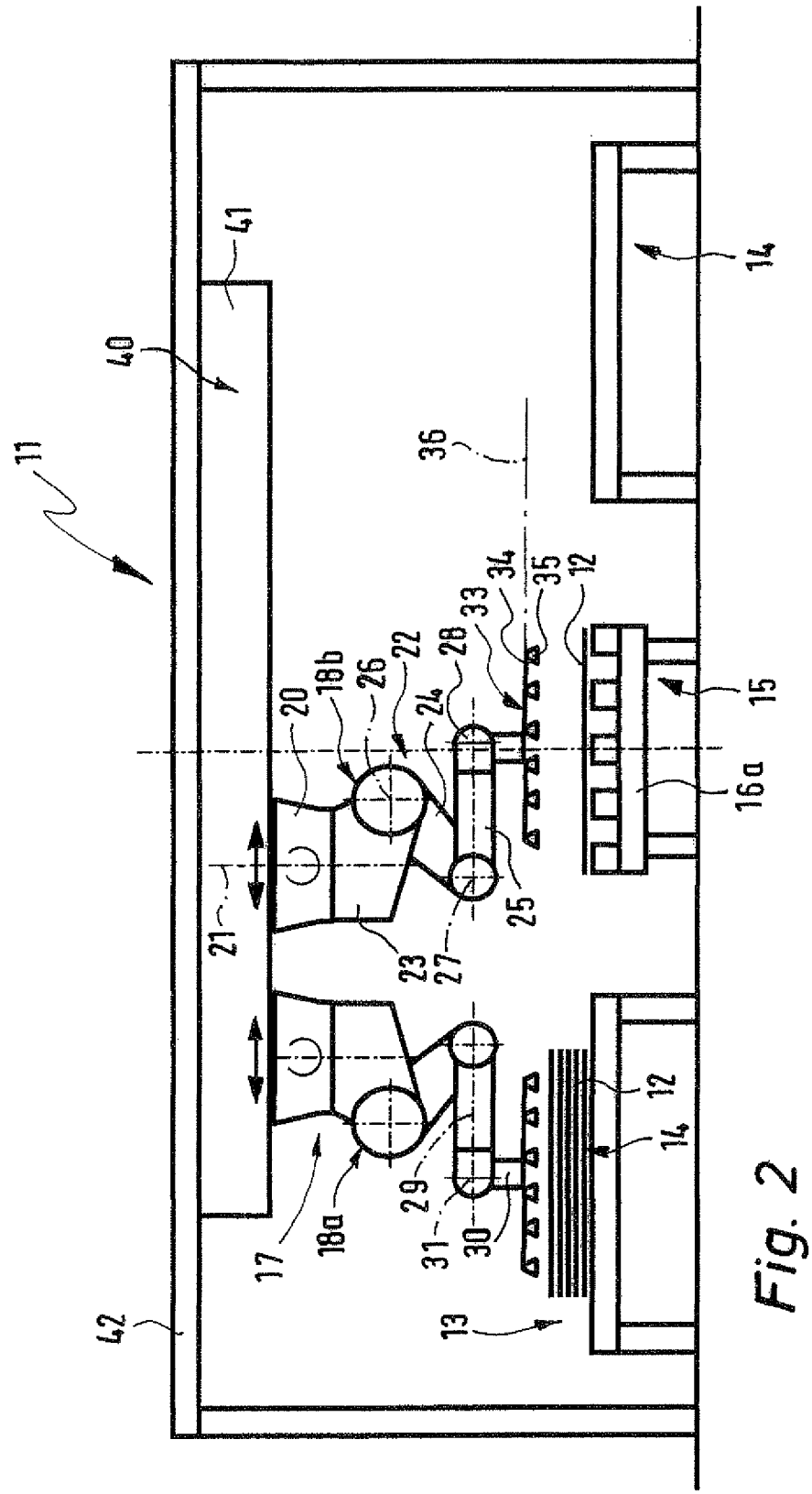

A preferred embodiment of the invention is illustrated in the drawing and explained in greater detail below. Of the drawing:

FIG. 1 is a side view of a preferred embodiment of the device for unstacking plate-shaped parts, and FIG. 2 is a view of the unstacking device from FIG. 1 in the direction of passage.

FIGS. 1 and 2 show a preferred embodiment of the device 11 according to the invention for unstacking plate-shaped parts 12. In the present context, the plate-shaped 12 parts are sheet metal blanks, for example body panels which have not yet been shaped. The device for unstacking, which will hereinafter simply be referred to as unstacking device 11, is a part of a press line in which the plate-shaped parts 12 finally arrive at a metal forming press where they are shaped.

The unstacking device 11 comprises at least one supply station 13 where at least one stack 14 of plate-shaped parts 12 is kept. In the illustrated example, the supply station 13 is a table-type parts magazine which may be capable of linear traverse. The unstacking device 11 may of course comprise several supply stations 13. In the supply station 13, the plate-shaped parts 12 are stacked horizontally on top of one another in the stack of parts 14.

The unstacking device 11 further comprises at least one conveyor station 15 where the unstacked plate-shaped parts 12 are deposited and transferred. As a rule, the unstacked, individual plate-shaped parts 12 are conveyed to a centring or positioning station where they can be aligned correctly for further transfer to the metal forming press. In the illustrated example, the conveyor station 15 comprises corresponding conveyor belts 16a, 16b, an unstacked plate-shaped part 12 being deposited on a first depositing belt 16a and from there being transferred to a feeding belt 16b, from where it is forwarded to the next station, for example the centring station.

To transfer the plate-shaped parts 12 between the supply station 13 and the conveyor station 15, an unstacking unit 17 is provided, which engages the stack of parts 14 and individually removes plate-shaped parts 12 and deposits them in the conveyor station 15 while unstacking the stack of parts 14. The core of the unstacking unit are two independently operating robots 18a, 18b, which alternately engage a common stack of parts 14 of the supply station 13 and are controlled by a control unit 19 in such a way that a first or a second robot 18a, 18b removes a plate-shaped part 12 from the stack 14 while the other, second or first, robot 18a, 18b deposits a picked-up plate-shaped part at the conveyor station 15.

The two robots 18a, 18b are designed as multiaxial articulated robots, having seven axes in the illustrated embodiment. The two robots 18a, 18b are further suspended from a support unit 42. Each robot 18a, 18b comprises a robot base 20 on which a motion unit 22 is mounted for pivoting about a first pivoting axis 21 which is vertical in the position of use, the motion unit comprising a base-side swivelling part mounted on the robot base 20 for pivoting about the vertical first pivoting axis 21. The motion unit 22 further comprises an articulated arm consisting of an upper arm 24 and a forearm 25. One end of the upper arm 24 of the articulated arm is pivotable together with the swivelling part about a second pivoting axis 26 which is horizontal in the position of use, while the other end is connected to the adjacent end of the forearm 25 while being capable of pivoting about a horizontal third axis 27.

The motion unit 22 further comprises a rotary member 28 located at the end of the forearm 25 which is opposite the upper arm 24 and rotatable about a fourth axis 29 extending in the longitudinal direction of the forearm 25. At the end opposite the forearm 25, the rotary member 28 is provided with a swivelling member 30 joined to the rotary member 28 while being capable of pivoting about a fifth axis 31 extending at right angles to the fourth axis 29.

A rotation member (not illustrated) rotatable about a sixth axis 32 extending at right angles to the fifth axis 31 and fitted with a support part 33 is attached to the swivelling member 30, so that the support part 33 follows the rotary motion of the rotary member. The support part 33 preferably supports a lifting device 34 with vacuum suction units 35. The arrangement is designed such that the support part 33 extends towards the sixth axis 32 from the swivelling member 30 or from the rotation member mounted thereon and that the lifting device 34 includes a retaining device holding the vacuum suction units, which is joined to the support part 33 while being rotatable about a seventh axis 36 oriented at right angles to the sixth axis 32. Further details on the structure and the motion sequence of an articulated robot with seven axes can be found in EP 1 623 773.

The unstacking unit 17 further comprises a linear guide device 40 for the horizontal linear guidance of the two robots 18a, 18b between the supply station 13 and the conveyor station 15. The linear guide device 40 includes the robot base 20, which is designed as a slide and guided in a linear arrangement along guide rails which are in turn mounted on a rail module 41.

The rail modules 41 are in turn attached to a gantry-type supporting device 42. Each of the two robots therefore has an additional axis, this being a traversing axis in the X-direction.

To unstack plate-shaped parts 12, a stack 14 of plate-shaped parts 12 is first made available in the supply station 13, the plate-shaped parts being stacked horizontally on top of one another.

The first robot 18a now removes one of the plate-shaped parts by having the vacuum suction units 35 pick up the respective plate-shaped part 12. At the same time, the second robot 18b deposits a plate shaped part 12 which has already been picked up independently of the first robot 18a on the depositing belt 16a of the conveyor station 15.

The plate-shaped part 12 picked up by the first robot 18a is then transferred to the conveyor station 15 by pivoting the motion unit of the robot 18a about the first pivoting axis 21, possibly with a superimposed linear traversing motion, while at the same time the second, unloaded robot 18b returns from the conveyor station 15 to the supply station by pivoting its motion unit 22 about the first pivoting axis 21, possibly with a superimposed linear traversing motion.

The plate-shaped part 12 picked up by the first robot 18a is finally deposited on the depositing belt 16a of the conveyor station 15, while the second robot 18b at the same time picks up a plate-shaped part 12 from the stack of parts 14 in the supply station 13. The control unit 19 controls the two robots 18a, 18b in such a way that a synchronous motion is obtained, i.e. while one robot picks up plate-shaped parts 12 from the stack of parts 14, the other robot 18b deposits plate-shaped parts 12 at the conveyor station 15. As the two robots 18a, 18b engage a stack of parts 14 alternately, the cycle time in the unstacking of plate-shaped parts is improved considerably. The synchronisation of the motions further eliminates downtimes in the motion sequences of the two robots 18a, 18b.

When the stack of parts 14 has been unstacked, the two robots 18a, 18b can engage the next stack of parts 14 made available at another supply station. if this new supply station is outside the swivelling range of the two robots 18a, 18b, the two robots 18a, 18b are first moved into the range of this supply station in a linear motion.

The invention claimed is:

1. A device for unstacking plate-shaped parts, the device comprising:
   at least one supply station in which at least one stack of plate-shaped parts is located,
   at least one conveyor station on which the plate-shaped parts are transported further in an unstacked manner,
   a gantry-type supporting device which bridges the at least one conveyor station,
   a linear guide device comprising two rail modules mounted at the supporting device which bridge the at least one conveyor station perpendicular to the at least one conveyor station, an unstacking unit to transfer the plate-shaped parts between the at least one supply station and the at least one conveyor station, said unstacking unit engaging the stack of parts and removing individual plate-shaped parts while unstacking the stack of parts and depositing the unstacked parts in the at least one conveyor station, wherein the unstacking unit comprises two robots designed as multiaxial robots with at least four pivoting axes and each having a rail module, of which a first vertical pivoting axis allows a swiveling motion between the supply station and the conveyor station, each of said robots being mounted in a suspended manner and linearly guided at the rail modules, each of said two robots being suspended from a supporting device and working independently of each other, which alternately engage at least one common stack of parts of the at least one supply station;

the device further comprising a control unit configured to control the two robots such that one of the two robots removes at least one plate-shaped part from the common stack of parts while another of the two robots simultaneously deposits at least one picked-up plate-shaped part at the at least one conveyor station.

2. The device according to claim 1, wherein the two rail modules extend parallel to each other in the same height above the conveyor station.

3. The device according to claim 1, wherein the at least one conveyor station comprises two conveyor belts of which one is a depositing belt on which plate-shaped parts are deposited and another is a feeding belt from where the plate-shaped parts are forwarded to a next station.

4. A method for unstacking plate-shaped parts (12), comprising:

providing at least one stack of plate-shaped parts, removing at least one plate-shaped part from the at least one stack of parts by a first robot, while another, already picked-up part is simultaneously deposited at a delivery point by a second robot operating independently of the first robot, wherein said first and second robots are designed as multiaxial robots with at least four pivoting axes, of which a first vertical pivoting axis allows a swiveling motion and the first and second robots are mounted in a suspended manner and are linearly guided at rail modules of a linear guide device, transferring the at least one part picked up by the first robot to the delivery point in a transfer motion including a swiveling and a linear motion of the first robot, while the second robot is simultaneously and without load returned from the delivery point to the stack of parts from which the first robot has previously picked up by a return motion involving a swiveling and a linear motion of the second robot, and depositing the at least one part picked up by the first robot at the delivery point while a plate-shaped part is simultaneously removed from the stack of parts by the second robot.

5. The method according to claim 4, wherein the swiveling of the first and the second robot in the transferring motion is in a same swiveling plane.

* * * * *